Nov. 22, 1966  D. C. HUBBARD ETAL  3,287,491
INSULATED SECTIONALIZING SPACER
Filed Jan. 27, 1964
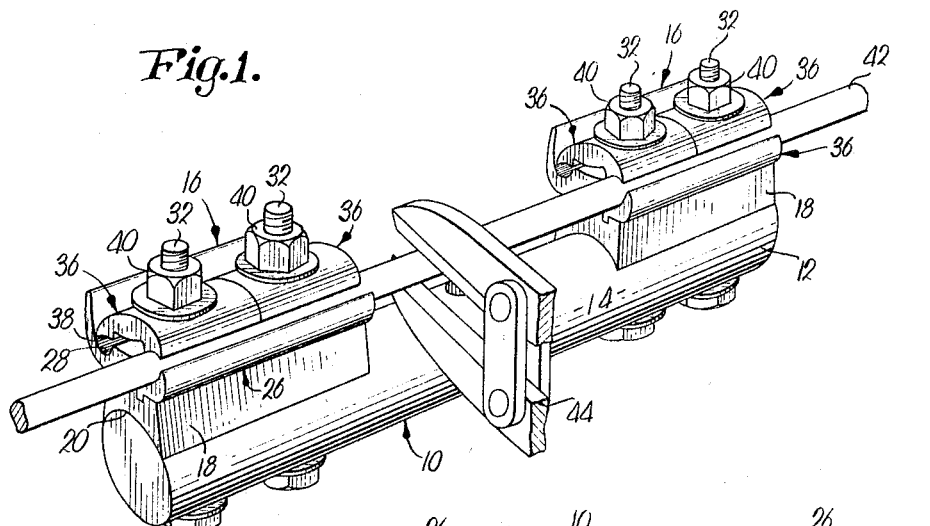
Fig.1.
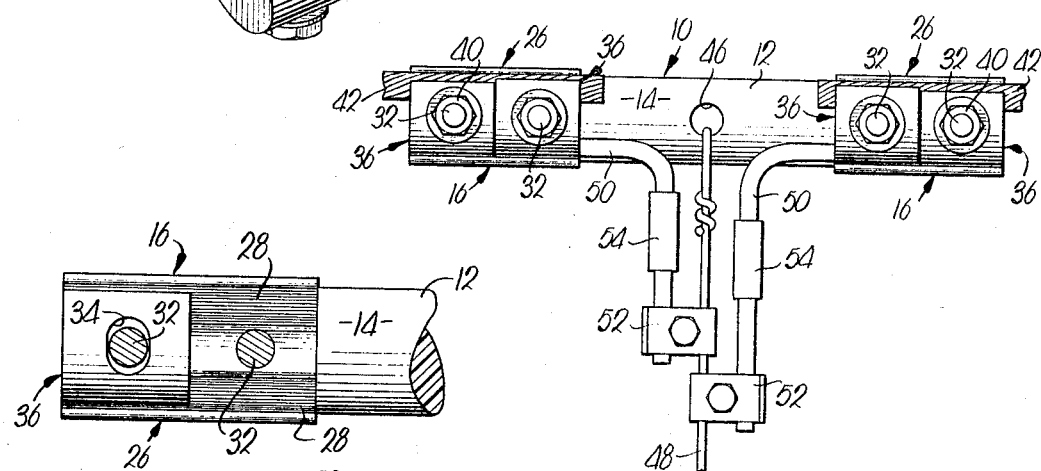
Fig.3.
Fig.2.
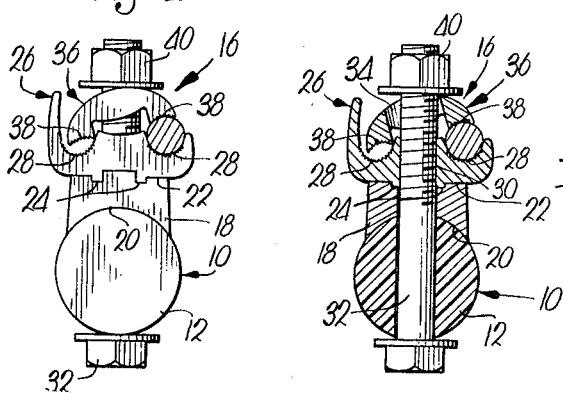
Fig.4.
Fig.5.
INVENTORS.
David C. Hubbard
Charles Clifton Cagle
BY Miller H. Fink
Clarence H. LeVee
Hovey, Schmidt, Johnson & Hovey
ATTORNEYS.

United States Patent Office 3,287,491
Patented Nov. 22, 1966

3,287,491
INSULATED SECTIONALIZING SPACER
David C. Hubbard, Charles Clifton Cagle, Miller H. Fink, and Clarence H. Le Vee, all of Centralia, Mo., assignors to A. B. Chance Company, Boone County, Mo., a corporation of Missouri
Filed Jan. 27, 1964, Ser. No. 340,166
2 Claims. (Cl. 174—138)

This invention relates to equipment for electrical transmission lines and more particularly to apparatus for sectionalizing a transmission line to facilitate the coupling of electrically conductive means to opposed ends of the sectionalized line. The sectionalizing of transmission lines has theretofore been conventionally accomplished by severing the line, and braiding or splicing the opposed ends of the severed line into loops which are then threaded through a suitable insulator so that the loops are intercoupled and insulated from one another and are exerting only compressive forces on the insulator. This is necessitated by the inability of heretofore conventionally available insulators to withstand tension forces. The coupling of a conductor to the line is accomplished through leads clamped to the conductor and to pigtails which are formed from the ends of the line when the loops are constructed.

An alternate method of sectionalizing a transmission line has relied on the use of preformed wire loops interengaged in an insulator and which are mechanically clamped to spaced segments of the line with separate clamps being utilized for clamping the severed ends of the line to the conductor. Here too, it has been necessary to insure that the insulator is disposed between the wire loops in a manner to impart only compressive forces to the insulator. Manifestly, conventional insulators of glass, ceramic or the like are totally unable to withstand the tension forces ordinarily present in electrical transmssion lines.

Further, the installation of the sectionalizing equipment heretofore mentioned usually requires the utilization of auxiliary line stretching apparatus for carrying the tension forces of the line until the equipment has been installed.

Accordingly, it is the primary object of the instant invention to provide apparatus for sectionalizing a transmission line having sufficient tensile strength to obviate the necessity for interengaging loops on the line, yet which has adequate insulating characteristics for electrically isolating the ends of the sectionalized line.

Another very important object of this invention is to provide sectionalizing apparatus which may be quickly and easily installed on a taut transmission line without slackening the line.

Still a further object of the invention is to provide line sectionalizing apparatus which may be applied to the line as a unitary assembly, thereby relieving the lineman of many of the separate installation and electrical connecting operations ordinarily required for installations of this kind.

Another object of the invention is to provide apparatus which facilitates the use of readily available cutting tools for severing the line after the apparatus is installed.

Still other important objects of the invention will be pointed out or become apparent as the specification continues.

In the drawing:

FIGURE 1 is a perspective view showing the line sectionalizing apparatus of this invention clamped to a transmission line, a pair of wire cutters appearing fragmentarily to illustrate the use thereof with the apparatus;

FIG. 2 is a plan view on a reduced scale of the apparatus illustrating one typical installation thereof in conjunction with a transmission line and conduit means;

FIG. 3 is a fragmentary plan view partially in section showing one of the line anchors with one of the clamps thereof removed to reveal details of construction;

FIG. 4 is an end elevational view of the apparatus; and

FIG. 5 is a vertical cross-sectional view of the apparatus.

The line sectionalizing apparatus embodying the principles of this invention is broadly designated by the numeral 10 in the drawings and includes an elongated, transversely circular, rigid, electrically non-conductive body 12 having an outer convex surface 14. A pair of line anchors broadly designated 16 are rigidly secured to body 12 in mutually spaced apart relationship as shown in FIG. 1 and FIG. 2. Each anchor 16 includes an elongated spacer block 18 having a concave bottom surface 20 embracing the outer convex surface 14 of body 12, and an irregular, grooved upper surface 22 configured to complementally receive a pair of parallel, longitudinally extending projections 24 on the bottom surface of an electrically conductive, elongated anchoring bracket broadly designated 26.

The upper irregular surface of bracket 26 is configured to present a pair of spaced, parallel, longitudinally extending, serrated grooves 28 and each bracket 26 has a pair of longitudinally spaced, internally threaded bores 30 adapted to receive a threaded fastener 32 in the nature of a bolt or the like for releasably securing the respective brackets 26 to the body 12. To this end, the spacers 18 and the body 12 are suitably drilled to receive the respective bolts 32.

The bolts 32 project upwardly beyond the upper surface of the brackets 26 and are received in elongated openings 34 in generally U-shaped clamps 36. As clearly illustrated in the drawings, there is a clamp 36 provided for each bolt 32 whereby each bracket 26 is presented with a pair of clamps 36 disposed in overlying relationship thereto. Each clamp 36 has a pair of spaced, parallel, arcuate channels 38 on the under surface of the clamp 36 and disposed in generally overlying relationship to the respective grooves 28 in the brackets 26. The channels 38 are provided with longitudinally extending serrations disposed in generally opposed relationship to the corresponding serrations on the grooves 28, whereby a line gripping surface is presented between the channels 38 and the respective grooves 28.

It should be noted that the radius of curvature of the grooves 28 and the opposing channels 38 are substantially different whereby the clamping of a line between the gripping surfaces causes a scrubbing of the outer surface of the line to remove the outer covering of the line as the latter is squeezed between the serrations of the gripping surface. This scrubbing action, contributed to by the differences in the radii of curvature of the opposed surfaces, effects a good electrical connection between the line and the corresponding anchor bracket 26.

Each clamp 36 is secured in place on its respective bolt 32 by suitable nut means 40 on the latter. Manifestly, the clamps 36 are individually removable from the anchor assemblies 16 to permit installation of the apparatus 10 on an electrical transmission line such as is illustrated in the drawings and designated by the numeral 42. Further, certain of the clamps 36 may be removed to permit the electrical coupling of auxiliary electrical conduit means to the brackets 26 for coupling the latter to the transmission line 42.

The brackets 26 and the clamps 36 may be formed by an extrusion process from a material capable of deflecting, such as an aluminum alloy, because such material has efficient electrical current-carrying capabilities, is relatively inexpensive, resistant to corrosion, and is rugged in construction. Further, the spacer blocks 18 may be extruded from similar material, it being recognized, however, that any conductive or non-conductive material could be used for this purpose. The body 12 is preferably constructed from reinforced, synthetic resin material and may be constructed pursuant to the teachings of U.S. Letters Patent No. 2,997,529, issued to Miller H. Fink on August 22, 1961, and assigned to the assignee of this application. Thus, body 12 comprises a cylindrical core of a solidified foam resin surrounded by layers of glass rovings impregnated with solidified resin and wrapped with a coated overlapping of woven glass tape. Body 12 is thereby capable of withstanding the tensile forces ordinarily encountered in work with electrical transmission lines without the necessity for additional load bearing equipment. Further, this material is electrically non-conductive to adequately sectionalize even highly energized transmission lines.

In operation, the apparatus 10 may be installed directly on a taut transmission line by merely loosening the respective clamps 36 so that the line may be inserted between the grooves 28 in the brackets 26 and the channels 38 in the clamps 36. The clamps are then tightened by a suitable tool such as a wrench or the like engaged on nut means 40 to thereby mechanically and electrically couple the transmission line to the respective brackets 26. The elongated openings 34 in the clamps 36 permit the latter to assume a disposition thereof for effecting a secure gripping of the line irrespective of whether or not both of the grooves 28 have a line received therein. Slight deflection of the bracket 26 under the clamping action causes the projections 24 to be squeezed toward one another to effectively lock the bolt 32 in bore 30 whereby a substantially greater torque on the bolt 32 is required to loosen the same. This prevents inadvertent loosening of the bolt 32 when the apparatus 10 is installed on a transmission line.

In the ordinary installation operation, it is but necessary to clamp the line 42 with only one of the clamps 36 on each assembly 16 prior to the severing of the line. One clamp is ordinarily adequate for securing each end of the severed line to the apparatus 10 and the other clamp 36 for each assembly 16 may be left loosely attached to the bracket 26 to permit installation of auxiliary conductive means after the line is severed. Alternatively, such conductive means may be attached by the second clamp 36 prior to the severing of the line if desired. Not to be overlooked is the fact that the apparatus 10 presents sectionalizing equipment of unitary construction wherein all of the clamps necessary to the sectionalizing operation are conveniently disposed at a single location and which may be conveniently and easily utilized by the workman for mechanically and electrically coupling auxiliary conduit means with the main transmission line.

After apparatus 10 is installed on the transmission line, it will be noted that the latter is held in spaced relationship from the outer surface of the body 12 so that the workman may insert the jaws of the wire cutters 44 between the line and the body 12 to effect the severing of the line. To this end, the outer convex surface 14 of body 12 permits ready insertion of the cutters 44 between the line and body 12, even if the workman is disposed at a relatively great distance from the apparatus 10.

One typical installation showing the utilization of apparatus 10 in sectionalizing a transmission line, is shown in FIG. 2 wherein body 12 is provided with a transversely extending mounting hole 46. A secondary electrical wire 48 is mounted to body 12 through hole 46. The main transmission line 42 was initially placed in spaced anchors 16 on body 12 and the outermost clamps 36 on corresponding anchors 16 to securely affix line 42 to apparatus 10. Thus, upon removal of the portion of line 42 between anchor 16 by utilization of wire cutter 44, opposed extremities of wire 42 are maintained in spaced, fixed, non-conductive relationship. A conductor is secured to each of the anchors 16 by the inner clamps 36 of respective anchors. Since connectors 52 join the outer extremities of respective conductors 50 to wire 48, a conductive path is thereby provided between opposed ends of main line 42. In the embodiment illustrated, the sectionalizing of the line 42 is necessitated to interpose fuse means 54 in conductors 50 between the line 42 and wire 48.

The sectionalizing of a transmission line is quickly and easily accomplished through the utilization of apparatus 10 wherein the operation merely involves the simple steps of applying a clamping force to spaced sections of the line, and severing the line intermediate the spaced sections. The rigid construction of apparatus 10 permits the maintaining of these spaced sections of the severed line in fixed spatial relationship wherein electrical coupling means such as conductors 50 may be readily coupled with the opposed ends of the severed line.

Although one typical installation of apparatus 10 has been illustrated and described in detail, it is to be understood that the present apparatus may be used for various sectionalizing purposes. These would include mounting of the apparatus 10 on a suitable support such as an upright member or crossbar forming a part of a transmission line pole or tower so that a bypass switch, overload switch or any other type of electrical current control unit may be easily and effectively connected to the opposed ends of the main line. Apparatus 10, because of its compactness, ease of installation and utility, either mounted directly in the line or on a supporting member, is especially useful for three-phase electrical distribution line networks.

It can now be seen that a reliable, easily installed sectionalizing apparatus has been provided which is capable of withstanding the tension ordinarily present in electrical transmission lines, and having electrical insulation qualities for electrically isolating the opposed sections of the severed line. The operation may be quickly and easily carried out with a minimum of effort by the workman without the need of auxiliary load bearing equipment and without requiring that the tension in the transmission line be released during the operation. The components of apparatus 10 are of rugged construction and are capable of effecting a permanent installation without the need for periodic replacement.

Having thus described the invention what is claimed as new and desired to be secured by Letters Patent is:

1. Electrical transmission line sectionalizing apparatus for facilitating coupling of electrically conductive means to opposed ends of the sectionalized line, said apparatus comprising:

an elongated, rigid body of synthetic resin material, said body having a convex outer surface;

a pair of electrically conductive anchoring brackets spaced along the body, each bracket having an irregular surface adapted to receive a respective end of said line and of the conductor means thereon to facilitate gripping thereof, each irregular surface being configured to present a pair of longitudinally extending, transversely arcuate grooves, each groove having a plurality of longitudinally extending serrations therein;

a spacer block for each of said brackets respectively, each block being disposed between the corresponding bracket and said outer surface of the body, each block having a concave surface for complementally engaging the convex surface of said body;

a pair of fasteners for each of said brackets rigidly securing the respective brackets and corresponding spacers to the body, said fasteners projecting outwardly beyond the irregular surfaces of the brackets;

a first clamp for each of said brackets operably coupled with one of the fasteners of a respective bracket for operating said first clamps, each first clamp having a gripping surface thereon disposed to cooperate with the irregular surface on the corresponding brackets, the first clamps being adapted to frictionally hold corresponding ends of said line and to electrically and mechanically couple the ends with the respective brackets; and a second clamp for each of said brackets operably coupled with the other of said fasteners of the respective bracket for operating said second clamps, each second clamp having a gripping surface thereon disposed to cooperate with said irregular surface on the corresponding brackets, the second clamps being adapted to electrically and mechanically couple said conductor means with the respective brackets.

2. Apparatus as set forth in claim 1 wherein the gripping surfaces of said first and second clamps are configured to present a pair of transversely arcuate channels disposed in opposed relationship with the grooves in said irregular surface, the radii of curvature of said arcuate grooves being substantially different from the radii of curvature of the arcuate channels.

References Cited by the Examiner
UNITED STATES PATENTS

| | | | |
|---|---|---|---|
| 2,187,135 | 1/1940 | Meisse | 174—209 X |
| 2,838,595 | 6/1958 | Parkyn | 174—138 |
| 2,997,529 | 8/1961 | Fink | 174—138 |
| 3,178,508 | 4/1965 | Norwood | 174—138 |

LEWIS H. MYERS, *Primary Examiner.*

DARRELL L. CLAY, *Examiner.*